US012788050B2

(12) United States Patent
Balboni

(10) Patent No.: US 12,788,050 B2
(45) Date of Patent: Nov. 10, 2026

(54) APPLYING AN ADDITIVE UPON SHAPING SHEET MATERIAL INTO A ROD INCORPORATING A HEATABLE SUSCEPTOR

(71) Applicant: PHILIP MORRIS PRODUCTS S.A., Neuchatel (CH)

(72) Inventor: Matteo Balboni, Sala Bolognese (IT)

(73) Assignee: Philip Morris Products S.A., Neuchatel (CH)

( * ) Notice: Subject to any disclaimer, the term of this patent is extended or adjusted under 35 U.S.C. 154(b) by 638 days.

(21) Appl. No.: 18/030,719

(22) PCT Filed: Oct. 11, 2021

(86) PCT No.: PCT/EP2021/078051
§ 371 (c)(1),
(2) Date: Apr. 6, 2023

(87) PCT Pub. No.: WO2022/074257
PCT Pub. Date: Apr. 14, 2022

(65) Prior Publication Data

US 2023/0371578 A1 Nov. 23, 2023

(30) Foreign Application Priority Data

Oct. 9, 2020 (EP) ..................................... 20201033

(51) Int. Cl.
*A24F 40/465* (2020.01)
*A24C 5/01* (2020.01)
(Continued)

(52) U.S. Cl.
CPC .............. *A24C 5/1892* (2013.01); *A24C 5/01* (2020.01); *A24C 5/1807* (2013.01); *A24D 1/002* (2013.01);
(Continued)

(58) Field of Classification Search
CPC ....... A24C 5/01; A24C 5/1807; A24C 5/1892; A24D 1/20; A24F 40/465
See application file for complete search history.

(56) References Cited

U.S. PATENT DOCUMENTS

2019/0208813 A1 7/2019 Rojo-Calderon
2020/0107571 A1 4/2020 Sanna
2022/0142235 A1* 5/2022 Batista et al. ........... A24D 1/20

FOREIGN PATENT DOCUMENTS

DE 102017109897 A1 * 11/2018 ........... A24D 3/0216
EP 2910133 8/2015
(Continued)

OTHER PUBLICATIONS

DE 102017109897 A1_Espacement_Machine_Translation (Year: 2025).*
(Continued)

*Primary Examiner* — Christopher M Rodd
*Assistant Examiner* — Ronnie Kirby Jordan
(74) *Attorney, Agent, or Firm* — Mueting Raasch Group

(57) ABSTRACT

A device (1) for producing an aerosol-generating rod (2) includes a converging device (3), a conveyor system (13), a susceptor guide (15), and an additive dispensing pipe (21). The conveyor system is configured to convey sheet material (11) through the converging device. The susceptor guide is configured to guide a susceptor (9). The susceptor guide extends into the converging device along an axial direction and comprises an exit opening (19) for the susceptor within the converging device. The additive dispensing pipe has an end section (29) extending within the converging device in parallel with the susceptor guide. The end section comprises a dispensing opening (31) to dispense an additive through the dispensing opening.

20 Claims, 3 Drawing Sheets

(51) Int. Cl.

| | |
|---|---|
| ***A24C 5/18*** | (2006.01) |
| ***A24D 1/00*** | (2020.01) |
| ***A24D 1/20*** | (2020.01) |
| ***A24F 40/20*** | (2020.01) |
| ***H05B 6/10*** | (2006.01) |

(52) U.S. Cl.
CPC ................ *A24D 1/20* (2020.01); *A24F 40/20* (2020.01); *A24F 40/465* (2020.01); *H05B 6/105* (2013.01)

(56) References Cited

FOREIGN PATENT DOCUMENTS

| | | |
|---|---|---|
| KR | 1288805 | 7/2013 |
| WO | WO 2011033121 | 3/2011 |
| WO | WO 2016097100 | 6/2016 |
| WO | WO 2018002084 | 1/2018 |
| WO | WO 2020044181 | 3/2020 |
| WO | WO 2020074494 | 4/2020 |
| WO | WO 2020074535 | 4/2020 |
| WO | WO 2020174027 | 9/2020 |
| WO | WO 2021018836 | 2/2021 |

OTHER PUBLICATIONS

PCT International Search Report and Written Opinion for PCT/EP2021/078051 dated Jan. 5, 2022 (12 pages).
International Preliminary Report on Patentability for PCT/EP2021/078051 dated Dec. 13, 2022 (19 pages).

* cited by examiner

APPLYING AN ADDITIVE UPON SHAPING SHEET MATERIAL INTO A ROD INCORPORATING A HEATABLE SUSCEPTOR

This application is a U.S. National Stage Application of International Application No. PCT/EP2021/078051 filed Oct. 11, 2021, which was published in English on Apr. 14, 2022, as International Publication No. WO 2022/074257 A1. International Application No. PCT/EP2021/078051 claims priority to European Application No. 20201033.6 filed Oct. 9, 2020.

The present disclosure relates to applying an additive to a sheet material that is formed into a rod incorporating a heatable susceptor.

It is known from practice to reshape sheet material within a shaping device to obtain a rod for use in the production of aerosol-generating articles, in particular for consumer products.

The rod may incorporate a susceptor therein to allow generating heat by subjecting the susceptor to an alternating magnetic field. This may allow heating the rod from within to release aerosol.

It may be desirable to add one or more substances to the rod. For example, it may be desirable to add aerosol-generating substances or flavorful substances to the rod. It may be desirable to provide an efficient way of modifying the properties of a rod of sheet material by adding one or more substances. It may be desirable to provide a way of obtaining a favorable distribution of one or more substances within the rod.

According to an aspect of the present invention, there is provided a device for producing an aerosol-generating rod. The device comprises a converging device, a conveyor system, a susceptor guide and an additive dispensing pipe. The conveying system is configured to convey sheet material through the converging device. The susceptor guide is configured to guide a susceptor. The susceptor guide extends into the converging device in particular along an axial direction. The susceptor guide comprises an exit opening for the susceptor within the converging device. The additive dispensing pipe has an end section. The end section extends within the converging device in parallel with the susceptor guide. The end section comprises a dispensing opening to dispense an additive through the dispensing opening.

Dispensing the additive within the converging device may ensure that a high percentage, in particular at least 95%, of the dispensed additive or all of the dispensed additive is applied to the sheet material or the susceptor, thereby reducing waste of additive and contamination of equipment by the additive.

The additive may be dispensed onto the sheet material while the sheet material is within the converging device, thus facilitating distribution of the additive over the sheet material in an efficient and controlled manner.

A desired distribution of the additive may be achieved by appropriately selecting the exact location of the additive dispensing pipe within the converging device, for example.

As the end section of the additive dispensing pipe extends within the converging device in parallel with the susceptor guide, the risk of damaging the sheet material due to interaction of the sheet material with the additive dispensing pipe is reduced. In particular, sheet material running along the susceptor guide may also run along the end section of the additive dispensing pipe. Due to the end section of the additive dispensing pipe extending in parallel with the susceptor guide, an obstruction due to the susceptor guide and the additive dispensing pipe of a path along which the sheet material is conveyed through the converging device is kept comparatively small.

As the end section of the additive dispensing pipe extends in parallel with the susceptor guide, the sheet material may be efficiently pressed from radially outside against the susceptor guide, or the additive dispensing pipe, or the susceptor guide and the additive dispensing pipe, while being conveyed through the converging device.

The dispensing opening may be provided in an end face of the end section of the additive dispensing pipe. The dispensing opening may open in the axial direction.

The dispensing opening may be provided in a circumferential surface of the additive dispensing pipe, in particular in a circumferential surface of the end section of the additive dispensing pipe. This may facilitate contact between the additive and the sheet material.

An end face of the additive dispensing pipe may be closed. An end face of the additive dispensing pipe in the axial direction may be closed.

The dispensing opening may face in an at least essentially radial direction. The additive may be dispensed through the dispensing opening at least essentially perpendicularly to a conveying direction of the sheet material. The additive may be dispensed through the dispensing opening at least essentially perpendicularly to the axial direction. The additive may be dispensed through the dispensing opening at least essentially perpendicularly to a conveying direction of the susceptor.

The converging device may be configured to shape the sheet material conveyed through the converging device into a rod incorporating the susceptor.

The converging device may be a funnel-shaped converging device.

The converging device may comprise one or more walls that are engaged by the sheet material upon conveying the sheet material through the converging device. Contact between the one or more walls of the converging device and the sheet material may reshape the sheet material, for example by one or more of bending, folding and compressing the sheet material.

The converging device may define a forming space through which the sheet material is conveyed. The forming space may at least partially be defined or delimited by one or more walls of the converging device.

The converging device may be configured to increasingly compress the sheet material as the sheet material progresses through the converging device. The converging device may be configured to increasingly compress the sheet material around the susceptor as the sheet material progresses through the converging device.

The conveyor system may be configured to convey the sheet material through the converging device along a path that at least essentially extends along the axial direction, or is at least essentially parallel to the axial direction.

The conveyor system may be configured to convey the susceptor through the converging device. The susceptor and the sheet material may be conveyed through the converging device along a general production direction. The axial direction may extend in the general production direction.

The end section of the additive dispensing pipe may have a circular cross section, or a rectangular cross section, or a polygonal cross section, or an irregular cross section, for example.

The dispensing opening may at least partially lie radially outside of the exit opening of the susceptor guide. If the additive is dispensed at least partially radially outside of the exit opening of the susceptor guide, distribution of the additive to the sheet material may be facilitated. Excessive contact between the additive and the susceptor may be prevented according to embodiments. However, according to other embodiments, excessive contact between the additive and the susceptor may be desirable.

The additive dispensing pipe may be fixed to the susceptor guide. By being fixed to the susceptor guide, the additive dispensing pipe may be stabilized. Further, the position of the additive dispensing pipe may be defined by the additive dispensing pipe being fixed to the susceptor guide. If the additive dispensing pipe and the susceptor guide are fixed to each other, the additive dispensing pipe and the susceptor guide may conveniently be inserted into the converging device together.

The end section of the additive dispensing pipe may circumferentially surround the susceptor guide. If the end section of the additive dispensing pipe circumferentially surrounds the susceptor guide, the risk of damaging the sheet material within the converging device may be reduced as compared to when the susceptor guide extends fully outside of the end section of the additive dispensing pipe. The additive may be dispensed through the dispensing opening particularly near the susceptor, if the additive dispensing pipe circumferentially surrounds the susceptor guide. The additive may be dispensed circumferentially around the susceptor guide, ensuring distribution of additive on all sides of the susceptor.

The dispensing opening and the exit opening may be concentrically arranged. In particular, the dispensing opening may concentrically surround the exit opening. The additive may be concentrically dispensed around the susceptor.

The dispensing opening may be defined between an outer surface of the susceptor guide and an inner surface of the additive dispensing pipe. In particular, the dispensing opening may be defined between an outer surface of the susceptor guide and an inner surface of the end section of the additive dispensing pipe. The dispensing opening may be ring-shaped, for example.

The susceptor guide may extend radially outside of the end section of the additive dispensing pipe within the converging device. The susceptor may extend along the end section of the additive dispensing pipe within the converging device. The susceptor guide may extend on a particular side of the end section of the additive dispensing pipe. The dispensing opening may be configured to dispense the additive on a particular side of the susceptor.

The dispensing opening may be located upstream of the exit opening with respect to the axial direction. In this case, the additive may be prevented by the susceptor guide from contacting the susceptor directly after the additive is dispensed through the dispensing opening. This may facilitate distribution of the additive onto the sheet material or adherence of the additive to the sheet material.

The dispensing opening may be located essentially at the position of the exit opening with respect to the axial direction. In this case, the additive may come in contact with both the susceptor and the sheet material immediately after being dispensed through the dispensing opening, thus facilitating contact of the additive both with the susceptor and the sheet material.

The dispensing opening may be located downstream of the exit opening with respect to the axial direction. In this case, the additive may be prevented from coming into contact with the sheet material directly after being dispensed through the dispensing opening. The additive may contact the susceptor directly after being dispensed through the dispensing opening. The additive may be taken along by the susceptor.

The device may further comprise a viscosity regulator configured to control a viscosity of the additive to be below a threshold value. The viscosity regulator may be configured to control the viscosity of the additive by heating the additive, for example. The viscosity regulator may be configured to heat the additive to a predetermined temperature. The predetermined temperature may be above room temperature. The predetermined temperature may be between 30 degrees Celsius and 60 degrees Celsius, or between 30 degrees Celsius and 40 degrees Celsius, or between 40 degrees Celsius and 50 degree Celsius, for example. The viscosity regulator may reduce the viscosity of the additive by subjecting the additive to shear forces. The viscosity regulator may control a pump supplying the additive from an additive tank to the additive dispensing pipe to control the viscosity of the additive to be below the threshold value. An increase in the pump speed may reduce the viscosity of the additive. The threshold value may be 5000 millipascal-seconds, for example.

In addition to the additive dispensing pipe described above, the device may comprise one or more further additive dispensing pipes. The one or more further additive dispensing pipes may be configured in the same manner or similarly as the additive dispensing pipe described above. In particular the one or more further additive dispensing pipes may respectively have an end section extending within the converging device in parallel with the susceptor guide and comprising a dispensing opening to dispense an additive through the dispensing opening. Different additive dispensing pipes may be connected to different additive supply tanks to enable dispensing different kinds of additives within the converging device.

The end section of the additive dispensing pipe may comprise at least two, or at least three, or at least four, or at least six, or at least eight, or at least ten, or more than ten dispensing openings to dispense an additive through the dispensing openings. The dispensing openings may be provided in a circumferential surface of the end section of the additive dispensing pipe. The dispensing openings may be evenly distributed over a circumference of the additive dispensing pipe.

The device may comprise an additive tank storing the additive and a pump configured to supply the additive from the additive tank to the additive dispensing pipe.

According to another aspect of the present invention, there is provided a method for producing a rod for an aerosol-generating device. The method comprises conveying a susceptor through a converging device. The susceptor is heatable by exposing the susceptor to an alternating magnetic field. A sheet material is shaped into a rod-shape incorporating the susceptor by conveying the sheet material through the converging device. An additive is dispensed through a dispensing opening within the converging device at an injection location inside the rod-shape upon shaping the sheet material into the rod-shape. The susceptor is guided through a susceptor guide and exits the susceptor guide through an exit opening of the susceptor guide within the converging device along an axial direction. The dispensing opening at least partially lies radially outwards of the exit opening of the susceptor guide.

As the additive is dispensed at an injection location inside the rod-shape upon shaping the sheet material into the rod-shape, a high percentage of the additive dispensed through the dispensing opening actually ends up within the rod-shape, thereby reducing waste of additive and contamination of equipment by the additive. As the additive is dispensed at an injection location inside the rod-shape, presence of additive in an inner region of the rod-shape (instead of only at an outer surface of the rod-shape, for example) may be ensured. Further, by dispensing the additive inside the rod-shape, excessive concentration of additive at the outer surface of the rod-shape may be prevented, thus preventing contaminating a wrapping material surrounding the rod-shape or the hands of a user touching the rod.

As the additive is dispensed upon shaping the sheet material into the rod-shape, the additive may be well distributed over the sheet material. For example, the additive may be distributed over top and bottom sides of the sheet material, without necessarily providing more than one dispensing opening within the converging device.

As the dispensing opening at least partially lies radially outwards of the exit opening of the susceptor guide, contact between the additive and the sheet material may be facilitated.

The additive may be dispensed into interspaces of the sheet material. Additive within interspaces of the sheet material may be heated together with the sheet material upon heating the susceptor.

The additive may be dispensed along the axial direction. The additive may leave the dispensing opening in parallel to the axial direction. The additive may be taken along the axial direction by one or more of the susceptor and the sheet material.

The additive may be dispensed along an at least essentially radial direction. The additive may leave the dispensing opening along an at least essentially radial direction. The additive may be dispensed onto the sheet material at least essentially perpendicularly to a conveying direction of the sheet material.

The additive may be dispensed through at least two, or at least three, or at least four, or at least six, or at least eight, or at least ten, or more than ten dispensing openings. The dispensing openings may be provided in a circumferential surface of an additive dispensing pipe. The dispensing openings may be symmetrically distributed over a circumference of the additive dispensing pipe.

The sheet material may comprise plant material. In particular, the sheet material may comprise herbaceous material. Sheet material comprising plant material, in particular herbaceous material, may be comparatively fragile, in particular, more fragile than sheet material conventionally used for forming filter plugs.

The additive may be configured to form aerosol when the rod is heated in an aerosol-generating device by means of the susceptor. The additive may form aerosol supplementary to an aerosol formed by the sheet material, when the rod is heated in an aerosol-generating device by means of the susceptor.

The additive may be dispensed as a liquid. The additive may have a higher viscosity than water, in particular may be a gel. The additive may have a viscosity between 5 Millipascal seconds (mPa s) and 40 Millipascal (mPa s), preferably in between 15 Millipascal seconds (mPa s) and 20 Millipascal (mPa s) at 40 degrees Celsius. In particular, the additive may have the viscosity of liquid menthol, namely roughly 17 Millipascal (mPa s) at 40 degrees Celsius. Dispensing the additive as a liquid may facilitate dispensing through the dispensing opening. If the additive is dispensed as liquid, distribution of the additive over the sheet material may be improved. The additive may soak into the sheet material.

The additive may comprise aerosol-generating substances, such as one or more of glycerin, glycerol, and propylene glycol, for example. The additive may comprise one or more flavorants, such as menthol, spearmint, peppermint, eucalyptus, vanilla, cocoa, chocolate, coffee, tea, spices (such as cinnamon, clove, and ginger), fruit flavorants, and combinations thereof. The additive may comprise nicotine. The additive may be pure menthol. The additive may comprise liquid menthol, in particular molten menthol. The additive may consist of liquid menthol, in particular molten menthol.

The method may comprise regulating or controlling a viscosity of the additive. In particular, the viscosity of the additive may be controlled to be below a predetermined threshold. The viscosity of the additive may be regulated or controlled by heating the additive. The additive may be heated before being dispensed through the dispensing opening The sheet material may be cast of a plant containing slurry or a plant containing paste. The sheet may be a cast of a slurry containing herbaceous material or of a paste containing herbaceous material. The slurry or the paste may comprise one or more species of herbaceous material. Casting herbaceous material as a sheet may allow the herbaceous material to be continuously supplied to the production process from a supply roll, for example.

The sheet material may comprise cut or ground herbaceous material. The cut or ground herbaceous material may, for example, comprise particular herbaceous material having a particle size between 40 microns and 50 microns.

The herbaceous material may comprise homogenized plant material.

The herbaceous material may, for example, comprise tobacco material, or clove material, or a mixture of clove material and tobacco material. Tobacco material, or clove material, or a mixture of clove material and tobacco material may, but does not have to, account for 100 percent of the herbaceous material. The herbaceous material may comprise no tobacco particles and 100 percent clove particles, based on the dry weight of the herbaceous material. The herbaceous material may comprise between 10 percent and 60 percent by weight clove particles and between 40 percent and 90 percent by weight tobacco particles, more preferably between 30 percent and 40 percent by weight clove particles and between 70 percent and 60 percent by weight tobacco particles, based on the dry weight of the herbaceous material. The sheet material may, for example, comprise a total content of between 40 percent and 90 percent by weight tobacco particles and a total content of between 10 percent and 60 percent by weight clove particles, based on dry weight of the sheet material.

The sheet material may, for example, comprise one or more of eugenol, eugenol-acetate, and beta-caryophyllene. In particular, the sheet material may comprise at least 125 micrograms of eugenol per gram of the sheet material, on a dry weight basis; at least 125 micrograms of eugenol-acetate per gram of the sheet material, on a dry weight basis; and at least 1 microgram of beta-caryophyllene per gram of the sheet material, on a dry weight basis.

The sheet material may comprise at least one of cellulose fibers and glycerin. Cellulose fibers may strengthen the sheet material and make it more resistant to breaking or tearing. Glycerin may facilitate the production of aerosol upon heating the sheet material.

The sheet material may comprise cotton. The sheet material may consist of cotton. The sheet material may be a cotton matrix.

The sheet material may have a thickness of less than 1 millimeter, or of less than 0.5 millimeters, or of less than 0.2 millimeters, or of less than 0.1 millimeters, or of less than 0.05 millimeters. The sheet material may have a thickness of at least 0.001 millimeters, or of at least 0.01 millimeters, or of at least 0.1 millimeters. Sheet material having a comparatively low thickness may be easier to shape into the rod-shape. Sheet material having a comparatively high thickness may be less likely to be torn or damaged upon dispensing the liquid onto the sheet material.

The sheet material may be crimped sheet material. The method may comprise crimping the sheet material upstream of the converging device. Crimping the sheet material may facilitate shaping the sheet material into the rod-shape. If the sheet material is crimped, the sheet material may be more likely to form folds upon shaping the sheet material. Folds in sheet material may serve to receive additive.

The susceptor may be a susceptor band. A cross-section of the susceptor in a sectional plane perpendicular to the axial direction may be rectangular, for example. The susceptor may be continuously conveyed through the susceptor guide. The susceptor may be continuously withdrawn from a supply roll.

The additive may be dispensed at a position within the converging device, at which a maximum diameter of the rod-shape is at most 400 percent, or at most 350 percent, or at most 300 percent, or at most 250 percent, or at most 200 percent, or at most 150 percent of a maximum diameter of the final rod-shape upon exiting the converging device. If the additive is dispensed at a position within the converging device, where the sheet material has already been shaped or compressed to a certain degree, efficient distribution of the additive over the sheet material may be facilitated.

The rod-shape may be formed essentially coaxially around the susceptor.

The additive may be dispensed upstream of the exit opening with respect to the axial direction.

The additive may be dispensed essentially at the position of the exit opening with respect to the axial direction.

The additive may be dispensed downstream of the exit opening with respect to the axial direction.

According to another aspect of the present invention, there is provided an aerosol-generating rod. The aerosol-generating rod comprises a susceptor, a sleeve of sheet material, and an aerosol-generating additive. The susceptor is configured to be heated by exposing the susceptor to an alternating magnetic field. The sleeve of sheet material surrounds the susceptor to form a rod incorporating the susceptor. The aerosol-generating additive is provided within the sleeve on the sheet material. A concentration of the aerosol-generating additive in the sheet material decreases in a direction radially away of the axially extending susceptor.

In particular, the amount of aerosol-generating additive in a radially inner cylindrical volume of the aerosol-generating rod is higher than the amount of aerosol-generating additive in a radially outer cylindrical volume of the aerosol-generating rod, wherein the radially inner cylindrical volume and radially outer cylindrical volume have the same volume size, and wherein the radially inner cylindrical volume and radially outer cylindrical volume combine to the volume of the aerosol-generating rod. Alternatively or additionally, the sheet material at the outer circumference of the rod may be free of aerosol-generating additive.

The concentration of the aerosol-generating additive may decrease from a radially inner region of the rod towards a radially outer region of the rod. If the concentration of the aerosol-generating additive is comparatively high in an inner region of the rod, heating of the aerosol-generating additive by way of the susceptor to generate aerosol may be facilitated. If the concentration of the aerosol-generating additive is comparatively low in the radially outer region of the rod, contamination of an outer surface of the rod by the additive may be reduced.

The susceptor may be provided at least essentially centrally within the rod.

The susceptor may, for example, be made of or comprise conductive material, such as metal or carbon.

The sheet material may be crimped sheet material. If the sheet material is crimped, the sheet material may be more likely to form folds or folded structures that are suitable to receive and hold the aerosol-generating additive.

The sheet material may comprise plant material. The sheet material may comprise herbaceous material.

The aerosol-generating additive may comprise menthol, for example. The aerosol-generating additive may be menthol.

According to another aspect of the present invention, there is provided a use of a dispensing opening to dispense an additive within a funnel-shaped converging device. A susceptor that is heatable by electromagnetic induction is conveyed through an exit opening of a susceptor guide within the funnel-shaped converging device. A sheet material is shaped into a rod-shape incorporating the susceptor within the converging device. The additive is dispensed through the dispensing opening along a direction that is parallel to a direction in which the susceptor exits the susceptor guide, or along a direction that is at least essentially perpendicular to a direction in which the susceptor exits the susceptor guide.

As indicated, according to different aspects, the invention provides a device for producing an aerosol-generating rod, a method for producing a rod for an aerosol-generating device, an aerosol-generating rod, and a use of a dispensing opening. The device may be suitable, adapted or configured to carry out the method or to implement the use. The device, the method or the use may be suitable, adapted or configured to produce the aerosol-generating rod. Features described with respect to one of the aspects may be transferred to, or combined with, any one of the other aspects.

The term "funnel-shaped" with respect to the converging device means that an area of the cross-section of a forming space of the converging device, in a sectional plane perpendicular to the axial direction, decreases along the conveying direction. The decrease may be continuous or step-wise, or continuous and step-wise.

The forming space of the converging device may be, but does not have to be, fully enclosed by a wall of the converging device circumferentially around the conveying direction.

The term "herbaceous material" is used to denote material from an herbaceous plant. A "herbaceous plant" is an aromatic plant, where the leaves or other parts of the plant are used for medicinal, culinary or aromatic purposes and are capable of releasing flavor into the aerosol produced by an aerosol-generating article.

The diameter of the rod-shape at a specific position along the axial direction refers to the largest extension of the rod-shape at the specific position in any direction that is perpendicular to the axial direction.

The invention is defined in the claims. However, below there is provided a non-exhaustive list of non-limiting examples. Any one or more of the features of these examples may be combined with any one or more features of another example, embodiment, or aspect described herein.

Example Ex1: Device for producing an aerosol-generating rod, comprising:

a converging device;

a conveyor system configured to convey sheet material through the converging device;

a susceptor guide configured to guide a susceptor, the susceptor guide extending into the converging device along an axial direction and comprising an exit opening for the susceptor within the converging device; and an additive dispensing pipe having an end section, the end section extending within the converging device in parallel with the susceptor guide and comprising a dispensing opening to dispense an additive through the dispensing opening.

Example Ex2: Device according to Example Ex1, wherein the dispensing opening at least partially lies radially outside of the exit opening of the susceptor guide.

Example Ex3: Device according to Example Ex1 or Ex2, wherein the additive dispensing pipe is fixed to the susceptor guide.

Example Ex4: Device according to any one of Examples Ex1 to Ex3, wherein the end section of the additive dispensing pipe circumferentially surrounds the susceptor guide.

Example Ex5: Device according to any one of Examples Ex1 to Ex4, wherein the dispensing opening and the exit opening are concentrically arranged.

Example Ex6: Device according to any one of Examples Ex1 to Ex5, wherein the dispensing opening is provided in a circumferential surface of the additive dispensing pipe.

Example Ex7: Device according to any one of Examples Ex1 to Ex6, wherein the dispensing opening faces in a radial direction.

Example Ex8: Device according to any one of Examples Ex1 to Ex5, wherein the dispensing opening is defined between an outer surface of the susceptor guide and an inner surface of the additive dispensing pipe.

Example Ex9: Device according to any one of Examples Ex1 to Ex3, wherein the susceptor guide extends radially outside of the end section of the additive dispensing pipe within the converging device.

Example Ex10: Device according to any one of Examples Ex1 to Ex9, wherein the dispensing opening is located upstream of the exit opening, or essentially at the position of the exit opening, with respect to the axial direction.

Example Ex11: Device according to any one of Examples Ex1 to Ex9, wherein the dispensing opening is located downstream of the exit opening with respect to the axial direction.

Example Ex12: Device according to any one of Examples Ex1 to Ex11, further comprising a viscosity regulator configured to control a viscosity of the additive to be below a threshold value, preferably by heating the additive.

Example Ex13: Device according to any one of Examples Ex1 to Ex12, wherein the end section of the additive dispensing pipe comprises at least two, or at least three, or at least four, or at least six, or at least eight, or at least ten, or more than ten dispensing openings to dispense the additive through the dispensing openings.

Example Ex14: Method for producing a rod for an aerosol-generating device, with the steps of:

conveying a susceptor through a converging device, the susceptor being heatable by exposing the susceptor to an alternating magnetic field;

shaping a sheet material into a rod-shape incorporating the susceptor by conveying the sheet material through the converging device; and dispensing an additive through a dispensing opening within the converging device at an injection location inside the rod-shape upon shaping the sheet material into the rod-shape, wherein the susceptor is guided through a susceptor guide and exits the susceptor guide through an exit opening of the susceptor guide within the converging device along an axial direction; and wherein the dispensing opening at least partially lies radially outwards of the exit opening of the susceptor guide.

Example Ex15: Method according to Example Ex14, wherein the additive is dispensed into interspaces of the sheet material.

Example Ex16: Method according to Example Ex14 or Ex15, wherein the additive is dispensed along the axial direction or along a radial direction.

Example Ex17: Method according to any one of Examples Ex14 to Ex16, wherein the sheet material comprises plant material.

Example E18: Method according to any one of Examples Ex14 to Ex17, wherein the additive is configured to form aerosol, supplementary to an aerosol formed by the sheet material, when the rod is heated in an aerosol-generating device by means of the susceptor.

Example E19: Method according to any one of Examples Ex14 to Ex18, wherein the sheet material is a cast of a plant-containing slurry or a plant-containing paste.

Example Ex20: Method according to any one of Examples Ex14 to Ex19, wherein the sheet material has a thickness of less than 1 millimeter, or of less than 0.5 millimeters, or of less than 0.2 millimeters, or of less than 0.1 millimeters, or of less than 0.05 millimeters.

Example Ex21: Method according to any one of Examples Ex14 to Ex20, wherein the sheet material is crimped sheet material.

Example Ex22: Method according to any one of Examples Ex14 to Ex21, wherein the rod-shape is formed essentially coaxially around the susceptor.

Example Ex23: Method according to any one of Examples Ex14 to Ex22, wherein the additive is dispensed at a position within the converging device, at which a maximum diameter of the rod-shape is at most 400 percent, or at most 350 percent, or at most 300 percent, or at most 250 percent, or at most 200 percent, or at most 150 percent of a maximum diameter of the final rod-shape upon exiting the converging device.

Example Ex24: Method according to any one of Examples Ex14 to Ex23, wherein the additive is dispensed upstream of the exit opening, or essentially at the position of the exit opening with respect to the axial direction.

Example Ex25: Method according to any one of Examples Ex14 to Ex23, wherein the additive is dispensed downstream of the exit opening.

Example Ex26: Aerosol-generating rod, comprising a susceptor that is configured to be heated by exposing the susceptor to an alternating magnetic field;

a sleeve of sheet material, the sleeve surrounding the susceptor to form a rod incorporating the susceptor; and an aerosol-generating additive provided within the sleeve on the sheet material.

Example Ex27: Aerosol-generating rod according to Example Ex26, wherein a concentration of the aerosol-generating additive decreases in a direction radially away from the axially extending susceptor.

Example Ex28: Aerosol-generating rod according to Example Ex26 or Ex27, wherein the amount of aerosol-generating additive in a radially inner cylindrical volume of the aerosol-generating rod is higher than the amount of aerosol-generating additive in a radially outer cylindrical volume of the aerosol-generating rod, wherein the radially inner cylindrical volume and the radially outer cylindrical volume have the same volume size, and wherein the radially inner cylindrical volume and the radially outer cylindrical volume combine to the volume of the aerosol-generating rod.

Example Ex29: Aerosol-generating rod according to any one of Examples Ex26 to Ex28, wherein the sheet material at the outer circumference of the rod may be free of aerosol-generating additive.

Example Ex30: Aerosol-generating rod according to any one of Examples Ex26 to Ex29, wherein the sheet material is crimped sheet material.

Example Ex31: Aerosol-generating rod according to any one of Examples Ex26 to Ex30, wherein the sheet material comprises plant material.

Example Ex32: Aerosol-generating rod according to any one of Examples Ex26 to Ex31, wherein the aerosol-generating additive comprises menthol.

Example Ex33: Use of a dispensing opening to dispense an additive within a funnel-shaped converging device, wherein a susceptor that is heatable by electromagnetic induction is conveyed through an exit opening of a susceptor guide within the funnel-shaped converging device and a sheet material is shaped into a rod-shape incorporating the susceptor within the converging device, and wherein the additive is dispensed through the dispensing opening along a direction that is parallel to a direction in which the susceptor exits the susceptor guide, or along a direction that is perpendicular to a direction in which the susceptor exits the susceptor guide.

Example Ex34: System comprising a device for producing an aerosol-generating rod according to any one of Examples Ex1 to Ex13, further comprising a second additive dispensing pipe, wherein the second additive dispensing pipe is configured to be used in the device for producing an aerosol-generating rod instead of the first additive dispensing pipe described in the respective one of Examples Ex1 to Ex13, wherein the first additive dispensing pipe and the second additive dispensing pipe are of different types.

Example Ex35: System according to Example Ex34, wherein the additive dispensing opening of the first additive dispensing pipe is positioned or shaped differently than the additive dispensing opening of the second additive dispensing pipe.

Example Ex36: System according to Example Ex34 or Ex 35, wherein the first additive dispensing pipe has a different number of additive dispensing openings than the second additive dispensing pipe.

Examples and embodiments will now be further described with reference to the figures, in which.

Figure 5:
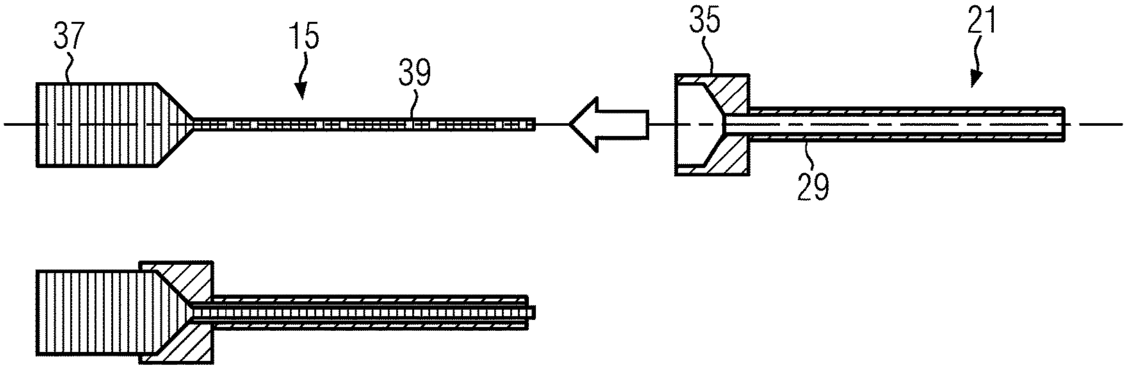
Figure 6:
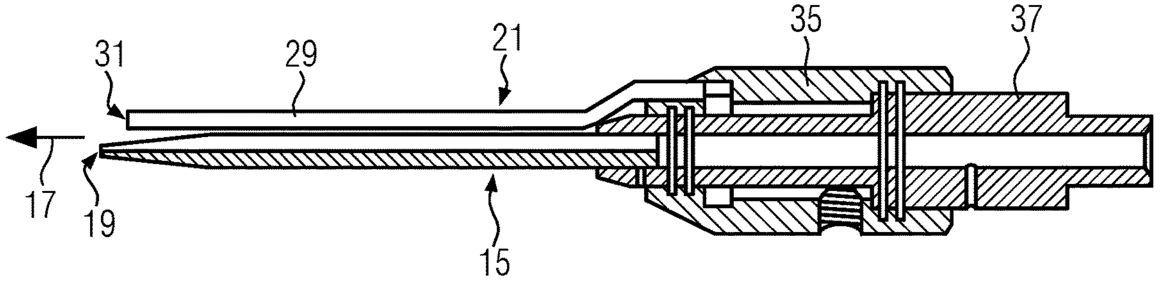
Figure 7:
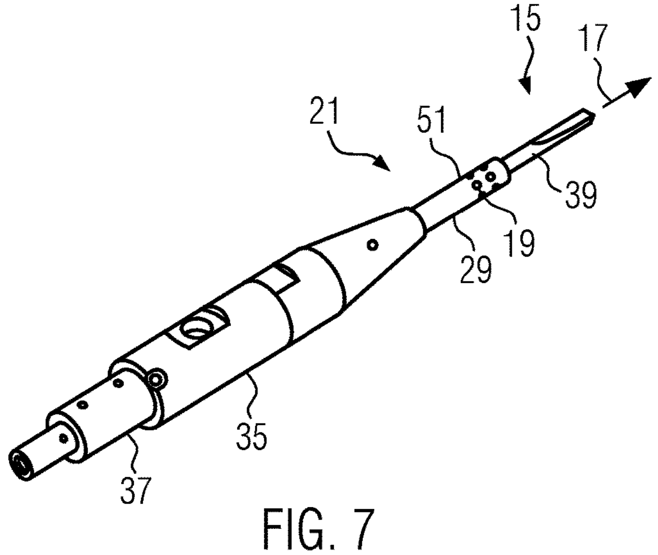

FIG. 5 schematically shows how the susceptor guide and the additive dispensing pipe may be assembled according to an embodiment;

FIG. 6 shows a sectional view of an assembly comprising a susceptor guide and an additive dispensing pipe according to an embodiment; and FIG. 7 shows a perspective view of an assembly comprising a susceptor guide and an additive dispensing pipe according to an embodiment.

Figure 1:
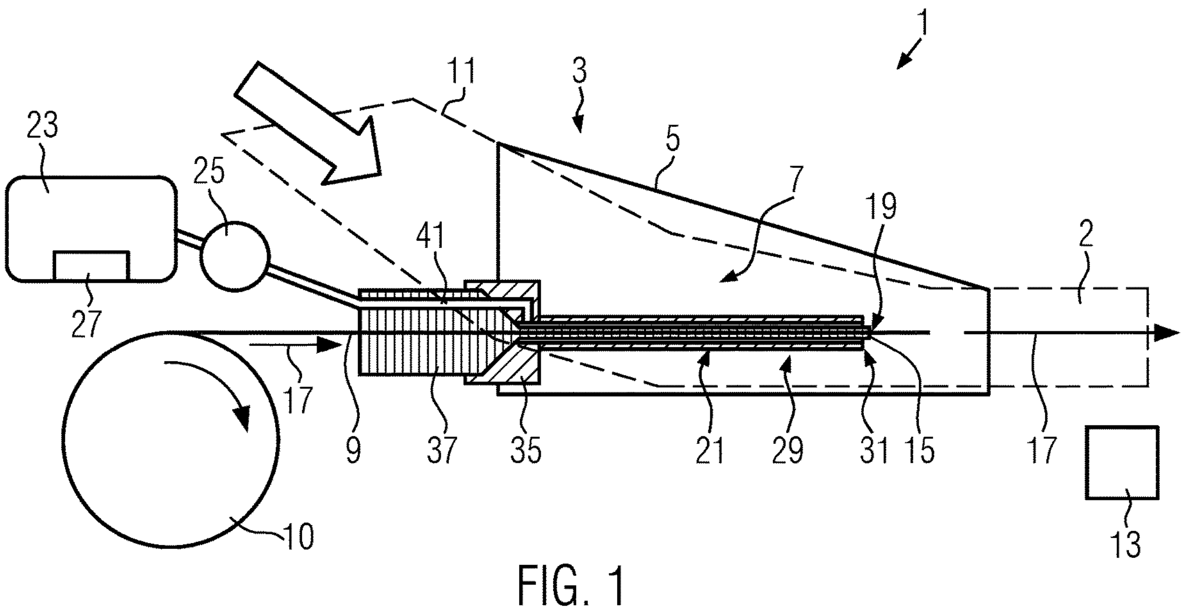
FIG. 1 shows a schematic sectional view of a device for producing an aerosol-generating rod according to an embodiment.
Figure 2:
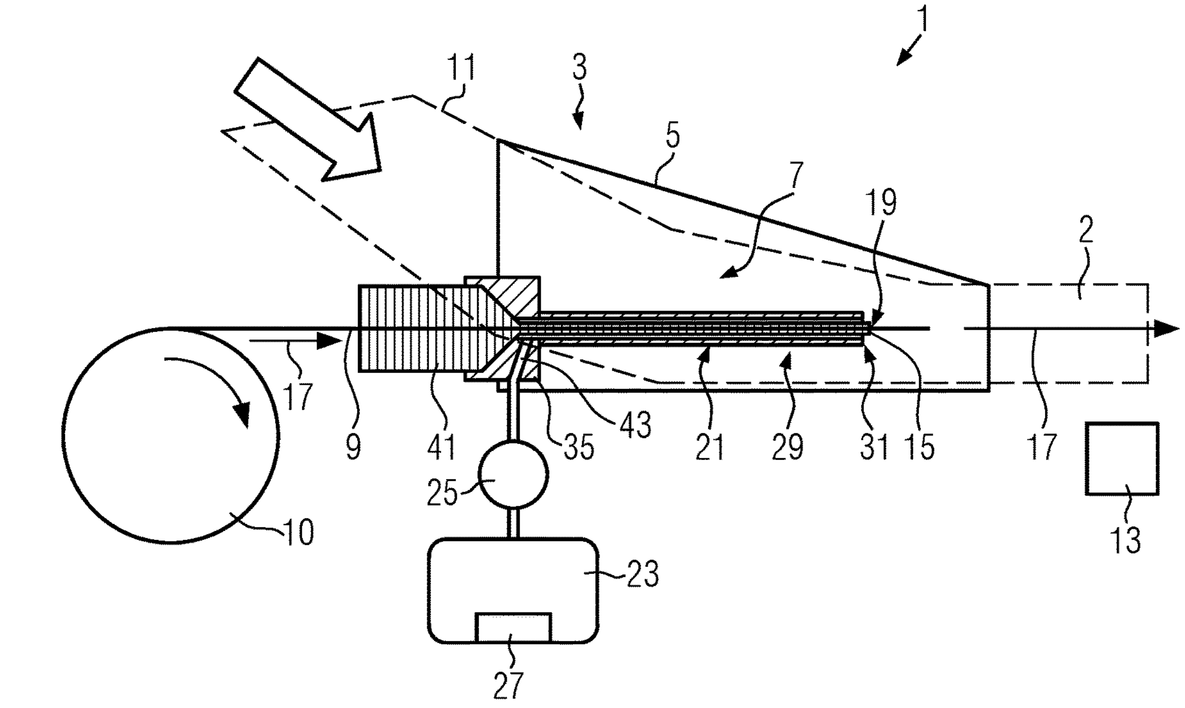
FIG. 2 shows a schematic sectional view of a device for producing an aerosol-generating rod according to another embodiment.

FIGS. 1 and 2 show a sectional view of a device 1 for producing an aerosol-generating rod 2 according to embodiments. The device 1 comprises a converging device 3. The converging device 3 is funnel-shaped and has a wall 5 defining a forming space 7 therein to produce an aerosol-generating rod 2.

A susceptor 9 and sheet material 11 are conveyed through the forming space 7 of the converging device 3.

The susceptor 9 is withdrawn from a supply roll 10 as a susceptor band. The susceptor 9 is configured to be heated by being exposed to alternating magnetic field. The susceptor 9 may be heated by means of induction heating. The susceptor 9 may, for example, be made of or comprise conductive material, such as metal or carbon.

The sheet material 11 may comprise reconstituted herbaceous material, such as reconstituted tobacco material, for example. The sheet material 11 may comprise cotton, for example. The sheet material 11 may be conveyed through the forming space 7 of the converging device 3 by a conveyor system 13 that is schematically shown in FIGS. 1 and 2. The conveyor system 13 may be configured to pull the sheet material 11 through the forming space 7 of the converging device 3. The conveyor system 13 may further be configured to convey the susceptor 9 through forming space 7 of the converging device 3, for example by pulling the susceptor 9.

A susceptor guide 15 extends into the forming space 7 of the converging device 3 along an axial direction 17. The susceptor guide 15 guides the susceptor 9. The susceptor 9 is conveyed through the susceptor guide 15. Within the forming space 7 of the converging device 3, the susceptor guide 15 comprises an exit opening 19 through which the susceptor 9 exits the susceptor guide 15 within the forming space 7 of the converging device 3.

A cross-sectional area of the forming space 7, in a sectional plane perpendicular to the axial direction 17, decreases along the axial direction 17. When the sheet material 11 is conveyed through the converging device 3, the sheet material 11 engages the wall 5 of the converging device 3 from inside the converging device 3 and is thereby shaped into a rod 2 incorporating the susceptor 9. Shaping the sheet material 11 into the rod 2 may comprise one or more of folding, bending and compressing the sheet material 11.

It is not required that the converging device 3, in particular the wall 5 of the converging device 3, is fully closed circumferentially along the axial direction 17. The converging device 3 may for example, be open at its lower side. Preferably, a support may be provided below the converging device 3, for example in the form of a garnish belt driven in the axial direction 17, and may support the sheet material 11 and the rod 2. It would, however, also be possible that the converging device 3 is fully closed circumferentially around the axial direction 17.

As shown in FIGS. 1 and 2, an additive dispensing pipe 21 is provided to supply an additive into the forming space 7 of the converging device 3. The additive dispensing pipe 21 is connected to an additive tank 23 storing the additive. A pump 25 is provided to supply the additive from the additive tank 23 to the additive dispensing pipe 21. Preferably, the additive is supplied as a liquid.

The additive may, for example, comprise aerosol-generating substances, such as one or more of glycerin, glycerol, and propylene glycol. The additive may comprise one or more flavorants, such as menthol, spearmint, peppermint, eucalyptus, vanilla, cocoa, chocolate, coffee, tea, spices (such as cinnamon, clove, and ginger), fruit flavorants, and combinations thereof. The additive may comprise nicotine. The additive may be pure menthol.

A viscosity regulator 27 may be provided to regulate a viscosity of the additive. In particular, the viscosity regulator 27 may control the viscosity of the additive to be below a threshold value. The threshold value may be 5000 millipascal-seconds, for example. In particular, the viscosity regulator 27 may regulate the viscosity of the additive by heating the additive. The viscosity of the additive may be reduced by heating the additive. The viscosity of the additive may be regulated by the viscosity regulator 27 to facilitate supplying the additive into the forming space 7 of the converging device 3 through the additive dispensing pipe 21. The viscosity regulator 27 may heat the additive to a predetermined temperature. The predetermined temperature may be above room temperature. The predetermined temperature may be between 30 degrees Celsius and 60 degrees Celsius, or between 30 degrees Celsius and 40 degrees Celsius, or between 40 degrees Celsius and 50 degree Celsius, for example. In the illustrated embodiments, the viscosity regulator 27 comprises a heater to heat the additive within the additive tank 23.

The additive is dispensed through the additive dispensing pipe 21 within the forming space 7 of the converging device 3 while the sheet material 11 is compressed around the susceptor 9 within the converging device 3. The additive is dispensed by the additive dispensing pipe 21 inside the rod-shape of the rod 2 upon shaping the rod 2.

Figure 3:
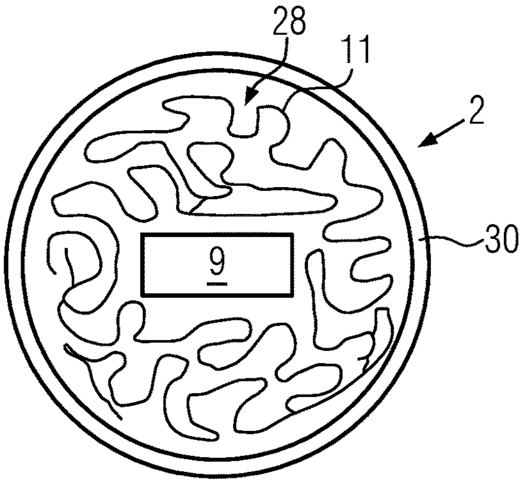
FIG. 3 shows a schematic sectional view of an aerosol-generating rod according to an embodiment.

FIG. 3 shows a sectional view of a rod 2 after production. At a radial center of the rod, 2 the susceptor 9 extends along the axial direction 17 (into the drawing plane). Along its extension in the axial direction 17, the susceptor 9 is surrounded by a sleeve 28 formed by the sheet material 11. The sheet material 11 is bent and folded, in particular in an irregular manner. Radially outside the sleeve 28 of sheet material 11, a wrapper 30 surrounds the sleeve 28 and forms an outer surface of the rod 2. The wrapper may optionally be wrapped around the sleeve 28 after or while the rod 2 exits the converging device 3. The wrapper 28 may, for example, be formed of a paper sheet.

As illustrated in FIGS. 1 and 2 and as explained in more detail hereunder, the additive is dispensed radially near the susceptor 9 upon forming the rod 2. This allows achieving a distribution of the additive within the final rod 2 that corresponds to a concentration of the aerosol-generating additive decreasing in a direction radially away from the axially extending susceptor 9 towards an outside.

According to the embodiments illustrated in FIGS. 1 and 2, the additive dispensing pipe 21 circumferentially surrounds the susceptor guide 15 within the forming space 7 of the converging device 3. This means that the susceptor guide 15 extends through the additive dispensing pipe 21.

Figure 4:
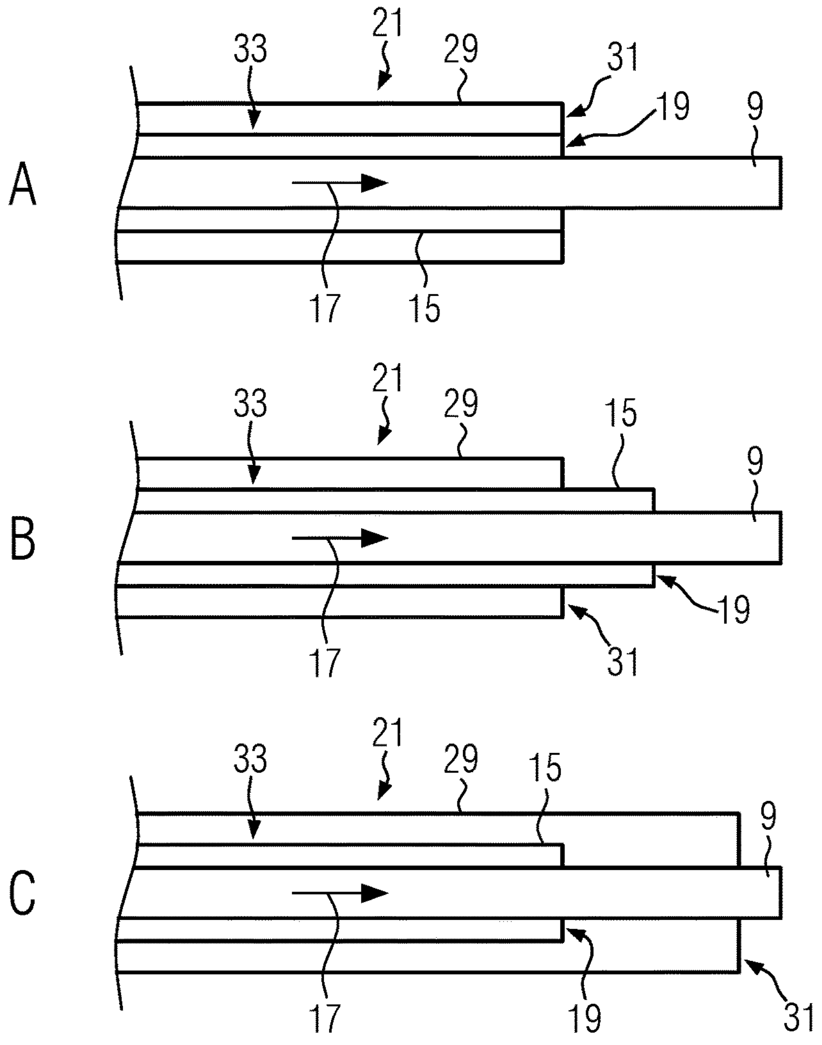
FIG. 4 shows three variants of relative positioning between a dispensing opening of an additive dispensing pipe and an exit opening of a susceptor guide according to embodiments.

FIG. 4 shows detailed views of the susceptor 9 leaving the exit opening 19 of the susceptor guide 15 and of an end section 29 of the liquid dispensing pipe 21 according to three different variants. According to each of the three variants, the end section 29 of the liquid dispensing pipe 21 extends in parallel to the susceptor guide 15 and comprise a dispensing opening 31 for dispensing the additive into the forming space 7 of the converging device 3. The dispensing opening 31 is provided in an end face of the liquid dispensing pipe 21. The susceptor guide 15 extends within the liquid dispensing pipe 21 along the axial direction 17. The susceptor guide 15 and the end section 29 of the liquid dispensing pipe 21 extend coaxially around the axial direction 17. For ease of illustration, the susceptor 9 in FIG. 4 is guided within the susceptor guide 15 with considerable play. The susceptor 9 could, however, also be guided more closely by the susceptor guide 15.

In the embodiment of part A of FIG. 4, the liquid dispensing pipe 21 and the susceptor guide end at the same position along the axial direction 17.

In the embodiment of part B of FIG. 4, the additive dispensing opening 31 of the end section 29 of the liquid dispensing pipe 21 is upstream, with respect to the axial direction 17, of the exit opening 19 through which the susceptor 9 exits the susceptor guide 15.

According to part C of FIG. 4, the additive dispensing opening 31 of the end section 29 of the additive dispensing pipe 21 is downstream, with respect to the axial direction 17, of the exit opening 19 through which the susceptor 9 exits the susceptor guide 15.

In each of the embodiments shown in FIG. 4, the additive is supplied to the additive dispensing opening 31 through a channel 33 between an outer surface of the susceptor guide 15 and an inner surface of the additive dispensing pipe 21.

FIG. 5 illustrates schematically how the susceptor guide 15 and the liquid dispensing pipe 21 may be assembled. According to the illustrated embodiment, the additive dispensing pipe 21 has, at its upstream end with respect to the axial direction 17, a base portion 35. The end section 29 of the additive dispensing pipe 21 extends from the base portion 35.

The susceptor guide 15 has a base portion 37 provided at its upstream end with respect to the axial direction 17. A guide portion 39 extends from the base portion 37 along the axial direction 17 to guide the susceptor 9. The guide portion 39 may circumferentially surround the susceptor 9.

As illustrated by the arrow in FIG. 5, the additive dispensing pipe 21 may be slipped onto the susceptor guide 15. Thereby, the end section 29 of the additive dispensing pipe 21 may slide over the guide portion 39 of the susceptor guide 15. The base portion 35 of the additive dispensing pipe 21 may abut the base portion 37 of the susceptor guide 15 in the assembled state.

The embodiments shown in FIGS. 1 and 2 differ from each other only in the way in which the additive is supplied from the tank 23 to the end section 29 of the additive dispensing pipe 21. In the embodiment of FIG. 1, the additive passes through a channel 41 in the base section 37 of the susceptor guide 15. In the embodiment of FIG. 2, the additive passes through a channel 43 provided in the base section 35 of the additive dispensing pipe 21.

FIG. 6 shows an alternative embodiment for the additive dispensing pipe 21 and the susceptor guide 15. The additive dispensing pipe 21 and the susceptor guide 15 shown in FIG. 6 could be used in the embodiments of FIGS. 1 and 2 instead of the additive dispensing pipe 21 and the susceptor guide 15 of the embodiments of FIGS. 1 and 2. In contrast to the embodiments of FIGS. 1, 2, 4 and 5, according to FIG. 6, the liquid dispensing pipe 21 does not concentrically surround the susceptor guide 15. Rather, the susceptor guide 15 is provided radially outside of the additive dispensing pipe 21 with respect to the axial direction 17 along which the susceptor 9 is guided through the susceptor guide 15. The end section 29 of the additive dispensing pipe 21 nevertheless extends in parallel to the susceptor guide 15 and in parallel to the axial direction 17. The additive dispensing pipe 21 is fixed to the susceptor guide 15. In particular, the base section of the additive dispensing opening 21 is fixed to the base section 37 of the susceptor guide 15.

FIG. 7 shows a further alternative embodiment for the additive dispensing pipe 21 and the susceptor guide 15. The additive dispensing pipe 21 and the susceptor guide 15 shown in FIG. 7 could be used in the embodiments of FIGS. 1 and 2 instead of the additive dispensing pipe 21 and the susceptor guide 15 of the embodiments of FIGS. 1 and 2. In the embodiment of FIG. 7, the end section 29 of the additive dispensing pipe 21 extends concentrically around the susceptor guide 15. In particular, the end section 29 of the additive dispensing pipe 21 extends concentrically around the axially extending guide portion 39 of the susceptor guide 15. The additive dispensing pipe 21 and the susceptor guide 15 may be combined by sliding the additive dispensing pipe 21 onto the susceptor guide 15.

In contrast to the embodiments of FIGS. 1, 2, 4, 5, and 6, according to FIG. 7, the additive dispensing pipe 21 is not open in the axial direction. Rather, an axial end face of the additive dispensing pipe 21 is closed. A plurality of additive dispensing openings 19 is arranged on a circumferential surface 51 of the end section 29 of the additive dispensing pipe 21. The additive dispensing openings 19 may be symmetrically arranged around a circumference of the end section 29. The additive is dispensed, in particular sprayed, onto the sheet material 11 through the additive dispensing openings 19. Any number of additive dispensing openings 19 may be arranged on the circumferential surface 51 of the end section 29, including in particular only one additive dispensing opening 19 or more than one additive dispensing openings 19.

A number of different additive dispensing pipes 21, for example two or more different additive dispensing pipes 21, may be provided to be used, one at a time, with the same susceptor guide 15. The additive dispensing pipes 21 may be of different types. The additive dispensing pipes 21 may have different arrangements and numbers of additive dispensing openings 19. The additive dispensing pipes 21 may have the same type of base portion 35 to ensure compatibility with the susceptor guide 15.

For the purpose of the present description and of the appended claims, except where otherwise indicated, all numbers expressing amounts, quantities, percentages, and so forth, are to be understood as being modified in all instances by the term “about”. Also, all ranges include the maximum and minimum points disclosed and include any intermediate ranges therein, which may or may not be specifically enumerated herein. In this context, therefore, a number A is understood as A±10% of A. Within this context, a number A may be considered to include numerical values that are within general standard error for the measurement of the property that the number A modifies. The number A, in some instances as used in the appended claims, may deviate by the percentages enumerated above provided that the amount by which A deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. A device for producing an aerosol-generating rod, comprising:
- a converging device;
- a conveyor system configured to convey sheet material through the converging device;
- a susceptor guide configured to guide a susceptor, the susceptor guide extending into the converging device along an axial direction and comprising an exit opening for the susceptor within the converging device;
- an additive dispensing pipe having an end section, the end section extending within the converging device in parallel with the susceptor guide and comprising a dispensing opening to dispense an additive through the dispensing opening;
- an additive tank storing the additive; and
- a pump configured to supply the additive from the additive tank to the additive dispensing pipe,
- wherein the end section of the additive dispensing pipe circumferentially surrounds the susceptor guide.

2. The device according to claim 1, wherein the dispensing opening at least partially lies radially outside of the exit opening of the susceptor guide.

3. The device according to claim 1, wherein the dispensing opening and the exit opening are concentrically arranged.

4. The device according to claim 2, wherein the dispensing opening is provided in a circumferential surface of the additive dispensing pipe.

5. The device according to claim 2, wherein the dispensing opening faces in a radial direction.

6. The device according to claim 2, wherein the dispensing opening is located upstream of the exit opening, or essentially at the position of the exit opening, with respect to the axial direction.

7. The device according to claim 2, wherein the dispensing opening is located downstream of the exit opening with respect to the axial direction.

8. The device according to claim 1, wherein the end section of the additive dispensing pipe comprises at least two dispensing openings to dispense the additive through the dispensing openings.

9. A device for producing an aerosol-generating rod, comprising:
- a converging device;
- a conveyor system configured to convey sheet material through the converging device;
- a susceptor guide configured to guide a susceptor, the susceptor guide extending into the converging device along an axial direction and comprising an exit opening for the susceptor within the converging device;
- an additive dispensing pipe having an end section, the end section extending within the converging device in parallel with the susceptor guide and comprising a dispensing opening to dispense an additive through the dispensing opening;
- an additive tank storing the additive; and
- a pump configured to supply the additive from the additive tank to the additive dispensing pipe,
- wherein the dispensing opening and the exit opening are concentrically arranged.

10. The device according to claim 9, wherein the dispensing opening at least partially lies radially outside of the exit opening of the susceptor guide.

11. The device according to claim 9, wherein the end section of the additive dispensing pipe circumferentially surrounds the susceptor guide.

12. The device according to claim 10, wherein the dispensing opening is provided in a circumferential surface of the additive dispensing pipe.

13. The device according to claim 10, wherein the dispensing opening faces in a radial direction.

14. The device according to claim 9, wherein the end section of the additive dispensing pipe comprises at least two dispensing openings to dispense the additive through the dispensing openings.

15. A device for producing an aerosol-generating rod, comprising:

a converging device;

a conveyor system configured to convey sheet material through the converging device;

a susceptor guide configured to guide a susceptor, the susceptor guide extending into the converging device along an axial direction and comprising an exit opening for the susceptor within the converging device;

an additive dispensing pipe having an end section, the end section extending within the converging device in parallel with the susceptor guide and comprising a dispensing opening to dispense an additive through the dispensing opening;

an additive tank storing the additive; and a pump configured to supply the additive from the additive tank to the additive dispensing pipe, wherein the end section of the additive dispensing pipe comprises at least two dispensing openings to dispense the additive through the dispensing openings.

16. The device according to claim 15, wherein the dispensing opening at least partially lies radially outside of the exit opening of the susceptor guide.

17. The device according to claim 15, wherein the end section of the additive dispensing pipe circumferentially surrounds the susceptor guide.

18. The device according to claim 15, wherein the dispensing opening and the exit opening are concentrically arranged.

19. The device according to claim 16, wherein the dispensing opening is provided in a circumferential surface of the additive dispensing pipe.

20. The device according to claim 16, wherein the dispensing opening faces in a radial direction.

* * * * *